United States Patent
Boeck

(10) Patent No.: US 7,516,962 B2
(45) Date of Patent: Apr. 14, 2009

(54) SPOKE-CENTERED BRUSH SEAL ARRANGEMENT FOR USE IN A GAS TURBINE

(75) Inventor: Alexander Boeck, Kottgeisering (DE)

(73) Assignee: MTU Aero Engines GmbH, Munich (DE)

(*) Notice: Subject to any disclaimer, the term of this patent is extended or adjusted under 35 U.S.C. 154(b) by 0 days.

(21) Appl. No.: 10/554,525

(22) PCT Filed: Apr. 17, 2004

(86) PCT No.: PCT/DE2004/000810

§ 371 (c)(1),
(2), (4) Date: Jan. 12, 2006

(87) PCT Pub. No.: WO2004/101957

PCT Pub. Date: Nov. 25, 2004

(65) Prior Publication Data
US 2006/0285970 A1    Dec. 21, 2006

(30) Foreign Application Priority Data
May 8, 2003    (DE)    ................. 103 20 450

(51) Int. Cl.
*F16J 15/44*    (2006.01)
(52) U.S. Cl. .................... 277/355; 277/579; 277/580
(58) Field of Classification Search ........... 277/355, 277/503, 505, 585, 579, 580
See application file for complete search history.

(56) References Cited

U.S. PATENT DOCUMENTS

| | | | | |
|---|---|---|---|---|
| 3,011,835 A | * | 12/1961 | Guthans ................... 384/149 |
| 3,019,035 A | | 1/1962 | Klompas .................... 285/18 |
| 4,767,267 A | | 8/1988 | Salt et al. ................... 415/174 |
| 5,090,710 A | * | 2/1992 | Flower ...................... 277/355 |
| 5,114,159 A | * | 5/1992 | Baird et al. ................ 277/355 |
| 5,474,305 A | * | 12/1995 | Flower ...................... 277/355 |
| 5,630,590 A | * | 5/1997 | Bouchard et al. .......... 277/301 |
| 5,704,760 A | * | 1/1998 | Bouchard et al. ......... 415/170.1 |
| 6,226,975 B1 | * | 5/2001 | Ingistov ..................... 60/772 |
| 6,364,316 B1 | * | 4/2002 | Arora ........................ 277/355 |
| 6,402,157 B1 | | 6/2002 | Zhou et al. ................. 277/355 |
| 6,932,347 B2 | | 8/2005 | Beichl et al. ............... 277/355 |

FOREIGN PATENT DOCUMENTS

| | | |
|---|---|---|
| DE | 196 28 559 | 1/1998 |
| DE | 101 22 732 | 11/2002 |
| EP | 0 495 256 | 7/1992 |
| GB | 643604 | 9/1950 |
| GB | 2 315 302 | 1/1998 |
| WO | WO 82/03657 | 10/1982 |
| WO | WO 9205378 A1 * | 4/1992 |

* cited by examiner

*Primary Examiner*—Patricia L Engle
*Assistant Examiner*—Gilbert Y Lee
(74) *Attorney, Agent, or Firm*—Davidson, Davidson & Kappel, LLC

(57) ABSTRACT

An arrangement is provided for a non-hermetical seal between the stator and the rotor of a gas turbine. The arrangement comprises a brush seal which is arranged in a receiving chamber that is formed by at least one spacer or reinforcing element arranged between preferably two cover or guide elements. The brush seal is hub-centered via sliding elements, especially via sliding pads, said sliding elements being integrated into the spacer or reinforcing element.

4 Claims, 1 Drawing Sheet

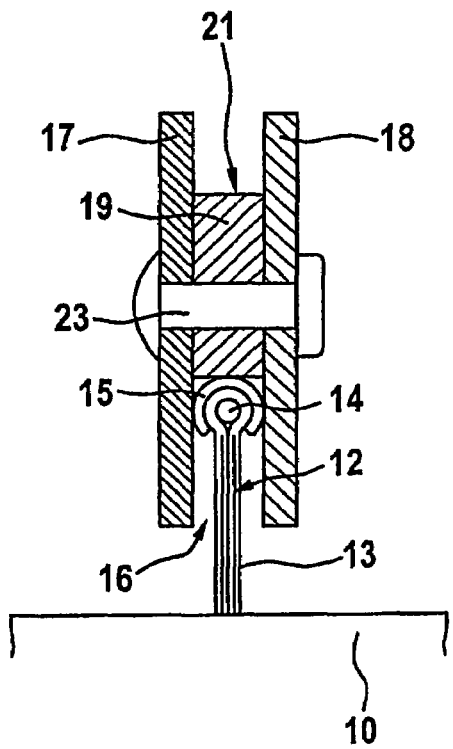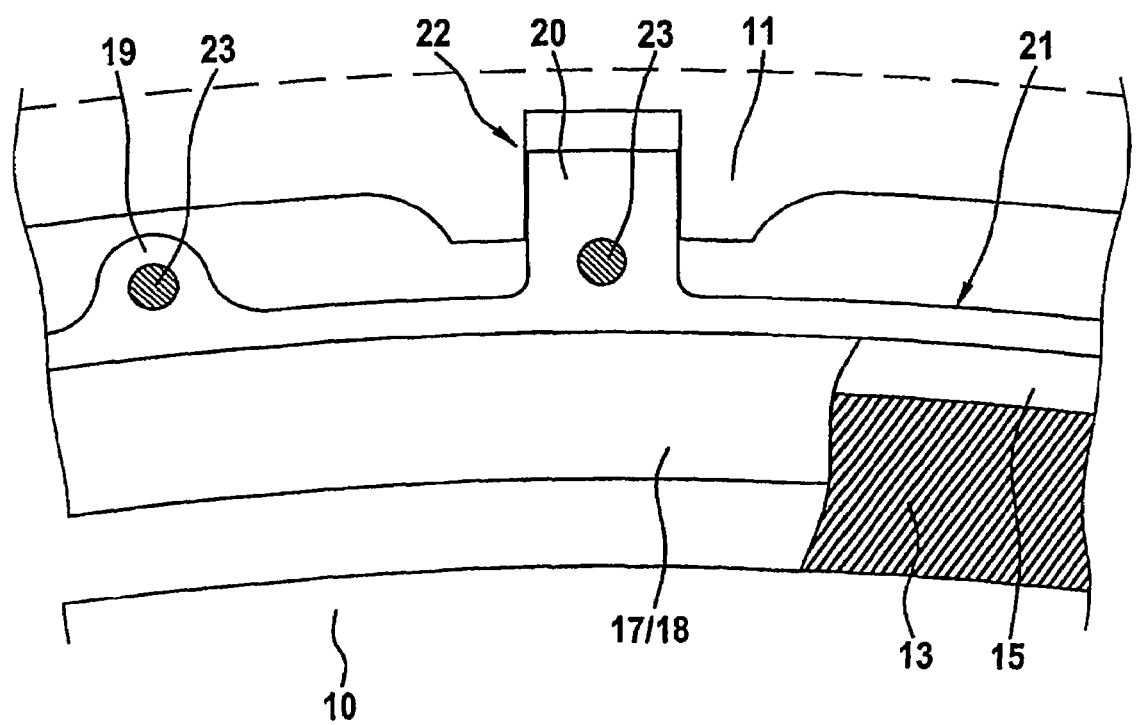

# SPOKE-CENTERED BRUSH SEAL ARRANGEMENT FOR USE IN A GAS TURBINE

FIELD OF THE INVENTION

The present invention is directed to an arrangement for a non-hermetic seal between a stator and a rotor of a gas turbine.

BACKGROUND

In gas turbines, particularly in aircraft engines, there are a number of application cases which require sealing off two parts one of which rotates relative to the other, namely a stator and a rotor of the gas turbine, from the gas flow streaming through the gas turbine. An example of such an application case is the sealing of a gap formed between the stator's stationary guide vanes and a rotor of an aircraft engine.

Brush seals are known from the related art for sealing annular gaps between assemblies that are rotating relative to one another. Brush seals of this kind are known, for example, from the German Patent Application DE 196 28 559 A1 or DE 101 22 732 A1.

The above brush seals known from the related art are formed from a plurality of wire-type bristles which are wound around a core element and are fixed thereto by a clamping ring. Under the related art, the unit including the clamping ring, core element and bristles, which makes up the actual brush seal, is arranged in a receiving space which is delimited by a stiffening ring, the stiffening ring being positioned between two guide elements, and the stiffening ring and the guide elements being joined to one another by at least one rivet.

From the related art, it is also known to design brush seals of this kind to be spoke-centered, bearings having a translational degree of freedom ensuring the spoke-type centering action. Bearings of this kind are formed in accordance with the related art by slide elements, in particular slide blocks, a slide block engaging in a corresponding slot. The spoke-type centering action makes it possible to better compensate for relative, thermally induced dimensional variations between the coaxially arranged components that are to be sealed off from one another—thus between the stator and rotor.

In accordance with the related art, the slide elements, in particular the slide blocks, are designed as separate assemblies. The slide blocks are joined to the stiffening ring by rivets, for example. When the slide blocks are riveted onto the stiffening ring, substantial manufacturing tolerances result, ultimately leading to a poor concentricity of the brush seal. In addition, a substantial outlay for assembly or manufacturing is entailed in fastening the slide blocks using rivets. Moreover, adequate space must be provided on the stiffening element for placing the riveted joints which are used in accordance with the related art for riveting on the slide blocks. This leads to an increase in the overall radial height of the seal arrangement, thereby limiting its scope of application and thus applicability.

SUMMARY OF THE INVENTION

Against this background, an object of the present invention is to devise a novel type of arrangement for a non-hermetic seal between a stator and a rotor of a gas turbine. In accordance with one such embodiment of the present invention, an arrangement is provided for a non-hermetic seal between a stator and a rotor of a gas turbine comprising a receiving space formed by at least one spacer element arranged between two cover elements, a plurality of slide elements integrated in the at least one spacer element, and a brush seal. The brush seal is positioned in the receiving space, and is spoke-centered via the slide elements.

In accordance with another embodiment of the present invention, a gas turbine is provided which includes a rotor, a stator, and a non-hermetic seal arrangement between the rotor and stator. The stator has a plurality of stator vanes positioned concentrically around the rotor, and the rotor and stator arranged to rotate opposite one another. The non-hermetic seal arrangement includes a receiving space formed by at least one spacer element arranged between two cover elements, a plurality of slide elements integrated in the at least one spacer element, and a brush seal. The brush seal is positioned in the receiving space and is spoke-centered via the slide elements.

In accordance with the present invention, the slide elements are integrated in the spacer or stiffening element. This renders possible a precise spoke-type centering action using structurally simple means. Since the slide elements designed in accordance with the related art as separate components are then an integral part of the spacer or stiffening element, the assembly or manufacturing outlay is reduced. Therefore, a cost reduction is achieved by the present invention. It is also possible to reduce the overall radial height, since the need is eliminated for joining the slide elements to the spacer or stiffening element, as required under related art methods.

BRIEF DESCRIPTION OF THE DRAWINGS

An exemplary embodiment of the present invention is clarified in greater detail with reference to the drawing, without being limited thereto. In the drawing:

FIG. 1 shows a detail of an arrangement according to the present invention for a non-hermetic seal between a stator and a rotor of a gas turbine, in a highly schematized cross section; and FIG. 2 shows a detail of the arrangement according to FIG. 1 in a highly schematized side view.

DETAILED DESCRIPTION

FIGS. 1 and 2 illustrate one preferred specific embodiment of the seal arrangement according to the present invention in highly schematized representations. FIG. 1 depicts a cross section through the seal arrangement according to the present invention; FIG. 2 shows a side view.

The seal arrangement illustrated in FIGS. 1 and 2 is used for sealing a radial gap between a rotor 10 and a stator 11 of a gas turbine, namely of an aircraft engine. Rotor 10 is a rotor that is bladed with so-called rotor blades. Assigned to stator 11 are stationary guide vanes which are secured to a likewise fixed casing of the gas turbine. Accordingly, the stationary guide vanes belong to the stator. The guide vanes form a so-called vane grid and are disposed concentrically around rotor 10. The seal arrangement according to the present invention is used to seal the radial gap in the root region of the stator vanes disposed concentrically around the rotor.

Positioned between rotor 10 and stator 11 is a brush seal 12. Brush seal 12 is formed from a plurality of wire-type bristles 13, which are bent around a rod-shaped core element 14 and are fixed to core element 14 with the aid of a clamping ring 15 that is preferably C-shaped in cross section.

Brush seal 12, made up of bristles 13, core element 14 and clamping ring 15, is positioned in a receiving space 16, which is formed by a spacer or stiffening element 19 situated between two cover or guide elements 17, 18. In this receiving space 16, brush seal 12 is positively secured against deflection in both axial directions. The portions of guide elements 17, 18 laterally bounding receiving space 16 may additionally be used for supporting bristles 13 of brush seal 12. Accordingly, these portions of guide elements 17, 18 may constitute the so-called supporting plate, as well as cover plate for brush seal 12.

Along the lines of the present invention, slide elements 20, which are used for the spoke-type centering action, are integrated in spacer or stiffening element 19 in such a way that they make up an integral part of spacer or stiffening element 19 and, accordingly, are no longer separate assemblies. To this end, a boundary surface 21 of spacer or stiffening element 19 facing stator 11 has a profiled design, i.e., projections in the boundary surface 21 form slide elements 20. This may be inferred, in particular, from FIG. 2.

As may likewise be inferred from FIG. 2, slide elements 20 formed as integral parts of spacer or stiffening element 19 mate with indentations or recesses 22 assigned to stator 11. By combining slide elements 20 and recesses 22, a bearing is formed, which renders possible a translatory motion having a degree of freedom in the radial direction. This kind of spoke-type centering action makes it possible to compensate for the different thermally induced dimensional variations of rotor 10 and stator 11 during operation of the gas turbine. This different dimensional variation is due to the different thermal capacities of rotor 10 and stator 11, so that thermal influences may differentially affect the expansion of rotor 10 and stator 11.

Since brush seal 12 concentrically surrounds rotor 10 and, in addition to brush seal 12, cover or guide elements 17, 18, as well as spacer or stiffening element 19 also have an annular shape, cover or guide elements 17, 18 may also be described as cover rings, and spacer or stiffening element 19 also as spacer ring. Positioned equidistantly from each other over the peripheral region of this spacer ring are a plurality of, preferably at least three, slide elements 20, which mate with corresponding recesses 22 of stator 11.

The unit, composed of the two cover or guide elements 17, 18, and the spacer or stiffening element 19 are joined by a plurality of fastening elements 23, which, in the illustrated exemplary embodiment, are formed as rivets. Since slide elements 20 are an integral part of spacer or stiffening element 19, it is merely necessary to have a fastening element 23 of this kind in the area of slide elements 20. A separate connection of slide elements 20 to spacer or stiffening element 19, as required under the related art, may be omitted. This eliminates the need for an additional riveted joint. Accordingly, the arrangement according to the present invention is distinguished by a low overall radial height.

Therefore, the present invention provides a sealing arrangement, in which slide elements 20, in particular so-called slide blocks, are an integral part of the so-called spacer ring 19. This reduces the number of individual components of the sealing arrangement according to the present invention and, thus, the expenditure required for assembly. It is possible to manufacture the sealing arrangement according to the present invention in few assembly steps and thus at low production costs. Therefore, the sealing arrangement according to the present invention may be realized cost-effectively and inexpensively. Since the need is eliminated for a separate fastening of slide blocks 20 to spacer ring 19, a low overall radial height of the sealing arrangement is able to be achieved. Accordingly, more compact designs are possible. Advantages are also derived from the fact that narrow tolerances may be observed for slide blocks 20, which, along the lines of the present invention, are an integral part of spacer ring 19. As a result, a precise spoke-type centering of the seal arrangement according to the present invention is possible.

It should be pointed out that the arrangement of the bristles of the brush seal may not only be predominantly radial, but also axial, with radial angling of the unattached ends. In this case, the brush seal would be designed as a hook-type brush seal.

What is claimed is:

1. An arrangement for a non-hermetic seal between a stator and a rotor of a gas turbine, comprising:
   a receiving space formed by at least one spacer element arranged between two cover elements;
   a plurality of slide elements integrated in the at least one spacer element;
   a brush seal, the brush seal positioned in the receiving space, the brush seal being spoke-centered via the slide elements;
   wherein the plurality of slide elements are arranged to mate with indentations or recesses in the stator, the slide elements movable in a radial direction within the indentations or recesses; and
   wherein the cover elements and the at least one spacer element are joined together by fastening elements.

2. The arrangement as recited in claim 1, wherein the fastening elements are a plurality of rivets.

3. A gas turbine, comprising
   a rotor;
   a stator, the stator having a plurality of stator vanes positioned concentrically around the rotor, the rotor and stator arranged to rotate opposite one another;
   a non-hermetic seal arrangement between the rotor and the stator, the seal arrangement including:
   a receiving space formed by at least one spacer element arranged between two cover elements;
   a plurality of slide elements integrated in the at least one spacer element; and
   a brush seal, the brush seal positioned in the receiving space, the brush seal being spoke-centered via the slide elements;
   wherein the cover elements and the at least one spacer element are joined together by fastening elements.

4. The gas turbine as recited in claim 3, wherein the fastening elements are a plurality of rivets.

* * * * *